United States Patent Office 3,037,562
Patented June 5, 1962

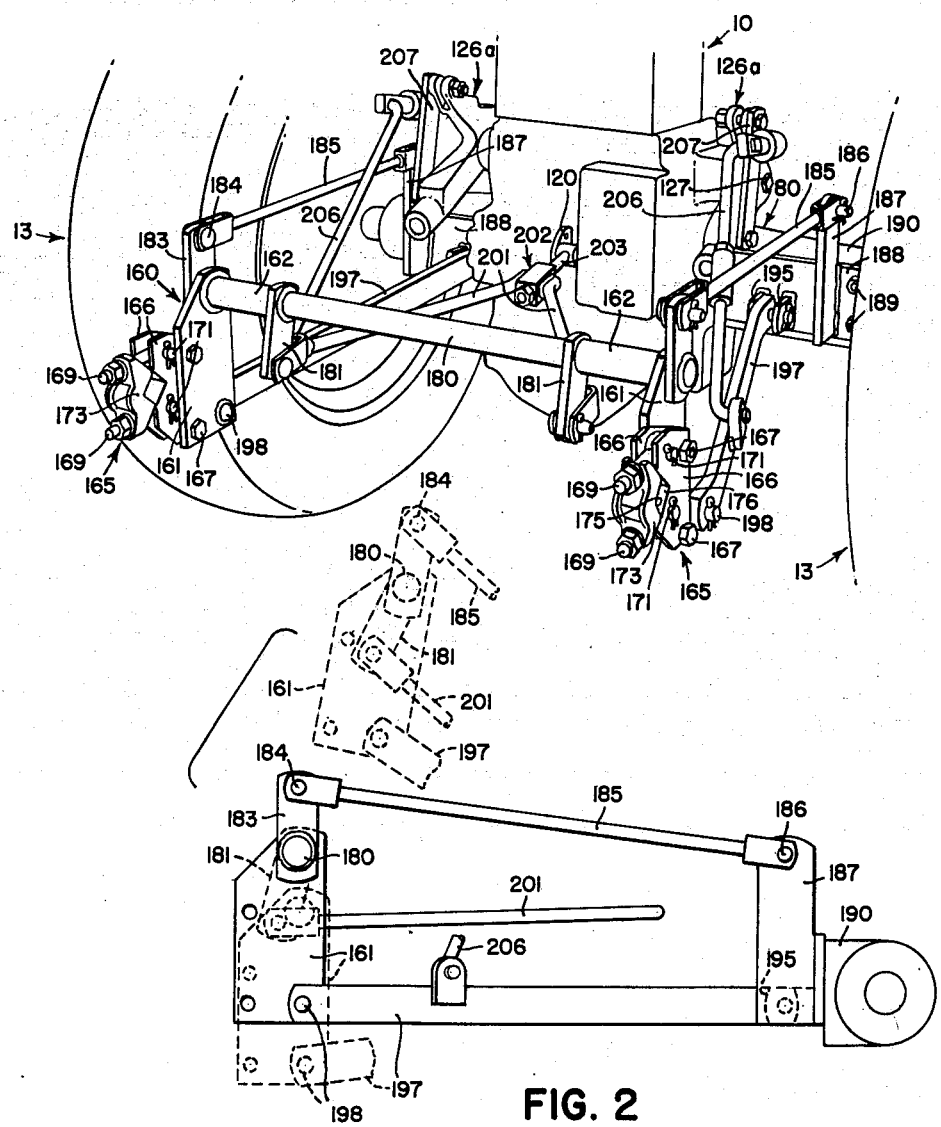

3,037,562
UNIT CARRIERS
William S. Tsuchiya, Los Angeles, Calif., assignor, by mesne assignments, to Deere & Company, a corporation of Delaware
Original application Jan. 13, 1958, Ser. No. 708,444, now Patent No. 3,001,590, dated Sept. 26, 1961. Divided and this application Feb. 19, 1960, Ser. No. 9,805
5 Claims. (Cl. 172—450)

This application is a division of my copending application Ser. No. 708,444, filed January 13, 1958, for Unit Carriers, now U.S. Patent 3,001,590, issued September 26, 1961.

The present invention relates generally to agricultural implements and more particularly implements adapted to be mounted on and carried by a farm tractor of the type having power lift means and what is commonly referred to as three-point hitch means.

The object and general nature of the present invention is the provision of a new and improved tool carrier adapted to be mounted on a tractor of the above-mentioned type so to be raised and lowered, and/or otherwise controlled, by the power lift mechanism of the tractor. Further it is the feature of this invention to provide a tool carrier of sturdy and rigid construction and adapted to receive soil working or ground engaging tools of various kinds, such as coil spring cultivators, fixed tooth cultivators, disks, furrow openers, sugar cane equipment, and other attachments commonly used in agricultural practice.

More particularly, it is a feature of this invention to provide a tool carrier to receive cultivating attachments and the like, and especially adapted for use with tractors having exceptionally high clearance so as to enable the outfit to be used with crops that have attained a considerable height of growth.

These and other objects and advantages of the present invention will be apparent to those skilled in the art after a consideration of the following detailed description of the preferred structure in which the principles of the present invention have been incorporated, taken in conjunction with the accompanying drawings, in which:

FIG. 1 is a rear perspective view of a tool carrier and its supporting tractor, in which the principles of the present invention have been incorporated.

FIG. 2 is a side view of the carrier shown in FIG. 1.

Referring first to FIG. 1, the tractor, shown only fragmentarily, is indicated in its entirety by the reference numeral 10 and includes the usual front wheels (not shown) and rear drive wheels 13 journaled for rotation on rear axle shafts 14. The tractor 10 is provided with a power lift mechanism that, so far as the present invention is concerned, is generally conventional, embodying a transverse power actuated rockshaft journaled in a power lift housing, and a rear axle structure 80 receiving the axle shafts 14.

The tool carrier 160 of this invention includes a pair of laterally spaced apart generally vertical members 161, each apertured at its upper end and around the aperture is fixed a laterally inwardly extending sleeve 162, the outer end of the latter being fixed as by welding to the upper end of the associated arm 161. Fixed to the lower end of each of the arms 161 is a tool bar receiving clamp 165 each of which comprises a pair of spaced apart clamp plates 166 fixed, as by bolts 167, to the associated arm 161. A pair of eye bolts 169 have their forward or eye ends disposed between the plates 166 and swingably connected therewith by pins 171. Mounted on each pair of bolts 169 is a clamp cap 173 that is notched, as at 175, to receive a conventional transverse tool bar (not shown). The clamp plates 166 are also notched and receive a V plate 176 welded thereto, the plate 176 having the same angularity as the notch 175 of the cap 173.

Rockably disposed within the bushings or sleeves 162 is a rockshaft 180 to which is welded a pair of load control arms 181, the arms being spaced so as to lie closely adjacent the inner ends of the sleeve 162. The outer ends of the rockshaft 180 extend outwardly beyond the lower link arms 161 and have welded or otherwise securely fixed thereto a pair of upwardly extending arms 183. The upper ends of the arms 183 are apertured to receive pivots 184 that connect compression link members 185 to the upwardly extending arms 183. The forward ends of the compression link members 185 are pivotally connected, as at 186, to uprights 187 that are fixed to attaching plates 188 apertured to receive attaching studs 189 that are carried by the laterally outwardly extending rear axle housing sections 190, which form a part of the tractor rear axle 80. Also secured to the attaching plates 188 are pairs of attaching lugs 195, each pair carrying a pivot to which the forward end of hte associated lower draft link 197 is swingably connected. The rear end of each of the links 197 is swingably connected to the lower end of the associated arm 161 by means of a laterally outwardly extending stud 198. The lower ends of the rockshaft arms 181 are pivotally connected with the forwardly converging bars 201 that form a load control fork indicated in its entirety by the reference numeral 202, the latter being adjustably connected, as by an adjusting rod 203, with the load response means 120 of the tractor. Lift links 206 are pivotally connected with and extend generally vertically from the draft links 197 and are connected by means of a pair of power lift attaching plates 207 that are removably connected with the power lift arms 126a of the tractor.

As shown in FIG. 1, the draft links 197 are connected to the tractor at a relatively high point, namely, at the rear axle housing 80. In order to prevent the imposition of excessive loads on the tractor load control or load response system, represented by the connection 120, the rockshaft 180 and associated parts are so constructed and arranged as to reduce, substantially by half, the load imposed on the tractor by the load control fork 202. This effect is secured in the following way. The ground working tools extend generally downwardly a substantial distance from the transverse tool bar that is seated in the tool bar clamps 165, and the effect of soil pressure against the lower ends of such tools is to rock the carrier frame 160 about the transverse axis that is defined by the lower link pivots 198. The upper ends of the carrier arms 161 transmit this force to the transverse rockshaft 180.

In effect, this reaction is divided between the upper compression links 185, which are fulcrumed at 186 on the upper ends of the fixed uprights 187, and the rearwardly diverging sections 201 of the load control fork 202. In this way, the tractor load control system is protected against overloads which might otherwise occur if the full reaction of the soil pressure in operation were transmitted directly to the load control connection 120.

Also, the load control fork 202 functions to prevent undesirable lateral displacement of the tool carrier, and the compression links 185, the rockshaft 180, and the load control fork 202 serve to prevent the tool from being displaced about a generally fore-and-aft extending axis, since if one end of the tool bar should tend to rise, relative to the other end, such action is prevented by the rockshaft 180, the arms 181 and 183, and the compression links 184, the rockshaft 180 being torsionally rigid.

Further, as will be seen particularly from FIG. 2, the angular relationship of the upper and lower links is such that, when the tractor power lift mechanism is operated to rock the power lift rockshaft 127, during approximately the first two-thirds of the range of movement the tool carrier 160 and associated tools move generally through parallel positions, but during the final one-third of the range of movement the tool carrier 160 experiences some rocking action about a generally transverse axis that results in imparting additional elevation to rearwardly extending tools, thus facilitating travel of the outfit in a transport position through depressions, swales and the like.

While I have shown and described above the preferred structure in which the principles of the present invention has been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. A tool carrier for a tractor of the three-point hitch type having means to receive the forward ends of a pair of laterally spaced apart lower draft links and means located generally centrally on the tractor above the level of said draft link-receiving means to receive the forward end of an upper thrust-transmitting link means, the latter comprising a laterally rigid generally V-shaped yoke having its apical portion disposed forwardly, said carrier comprising an upper rigid transverse rockshaft adapted to extend from one side of the tractor to the other side thereof, tool-receiving members swingably connected, respectively, with the end portions of said rigid rockshaft and extending downwardly therefrom, tool-receiving means carried at the lower end portions of said members, lower link-receiving means swingably connected with the lower end portions of said members, first arm means carried by said rigid rockshaft in spaced apart relation thereon and extending outwardly therefrom to receive the rear portions of said laterally rigid thrust-transmitting yoke, second arm means on said rockshaft and extending outwardly therefrom generally opposite said first arm means, and thrust link means pivotally connecting the outer ends of said second arm means to the tractor.

2. A tool carrier for a tractor of the three-point hitch type having means to receive the forward ends of a pair of laterally spaced apart lower draft links and means above said draft link-receiving means to receive the front end of an upper thrust-transmitting link means, said carrier comprising a rigid tool carrier frame, lower draft link receiving means pivotally connected with the rear ends of said lower draft links and extending upwardly therefrom, a rockshaft rockably mounted in the upper portion of said carrier frame, downwardly extending arm means fixed to said rockshaft and receiving the rear end of said upper thrust-transmitting link means, upwardly extending arm means fixed to said rockshaft, and compression link means connected with said second arm means and extending forwardly to points of connection with the tractor.

3. A tool carrier adapted to be connected to a tractor having a rear axle housing and a load response connection, said carrier comprising a traverse carrier frame, a pair of attaching brackets adapted to be connected in laterally spaced apart relation to the tractor axle housing, a pair of draft links pivotally connecting the lower portion of said carrier frame with the lower portions of said attaching brackets, a member rockably mounted on said carrier frame and including a generally upwardly extending arm means and a generally downwardly extending arm means, thrust-transmitting link means connected with one of said arm means and adapted to be connected with said load responsive connection, and compression link means connecting the other arm means of said rockable member with the upper portions of said attaching brackets.

4. A tool carrier adapted to be connected with a tractor having load responsive means, said carrier comprising a carrier frame including a pair of laterally spaced apart upwardly extending members, a transverse member rockably mounted on the upper portions of said carrier frame members and having upper and lower arms, draft link means connecting the lower portion of said carrier frame with the tractor, first and second link means connecting said upper and lower arms with the tractor and with said load responsive means, and tool receiving means carried by said carrier frame members below said rockable member.

5. A tractor mounted tool carrier comprising a pair of laterally spaced apart lower draft links connected at their forward ends with the tractor, an upper thrust-transmitting link means connected at its forward end with the tractor, a carrier frame, tool-receiving means thereon, draft link receiving means on the lower portion of said carrier frame, a rockshaft on said carrier frame, a first means on said rockshaft to receive the rear end of said upper link means, a second link-receiving means on said rockshaft and disposed oppositely relative to said first link-receiving means, and compression link means connected with said second link-receiving means and extending forwardly to points of connection with the tractor.

References Cited in the file of this patent

UNITED STATES PATENTS

| | | |
|---|---|---|
| 2,336,410 | McKay | Dec. 7, 1943 |
| 2,515,637 | Dooley et al. | July 18, 1950 |
| 2,675,751 | Weber | Apr. 20, 1954 |
| 2,692,148 | Bywater | Oct. 19, 1954 |
| 2,697,393 | Gardner | Dec. 21, 1954 |
| 2,755,722 | Fraga | July 24, 1956 |

UNITED STATES PATENT OFFICE
CERTIFICATE OF CORRECTION

Patent No. 3,037,562                      June 5, 1962

William S. Tsuchiya

It is hereby certified that error appears in the above numbered patent requiring correction and that the said Letters Patent should read as corrected below.

Column 4, line 5, for "traverse" read -- transverse --.

Signed and sealed this 27th day of November 1962.

(SEAL)
Attest:
ESTON G. JOHNSON
XXXXXXXXXXXXXXX
Attesting Officer

DAVID L. LADD
Commissioner of Patents